United States Patent
Thomas et al.

(10) Patent No.: US 6,590,899 B1
(45) Date of Patent: Jul. 8, 2003

(54) SYSTEM FOR CONSOLIDATING TELECOMMUNICATIONS TRAFFIC ONTO A MINIMUM NUMBER OF OUTPUT PATHS

(75) Inventors: Shaji A. Thomas, McKinney, TX (US); Robert W. Cantwell, Lucas, TX (US)

(73) Assignee: Alcatel USA Sourcing, L.P., Plano, TX (US)

(*) Notice: Subject to any disclaimer, the term of this patent is extended or adjusted under 35 U.S.C. 154(b) by 0 days.

(21) Appl. No.: 09/148,175

(22) Filed: Sep. 4, 1998

Related U.S. Application Data

(63) Continuation-in-part of application No. 08/777,775, filed on Dec. 31, 1996, now Pat. No. 5,974,050.
(60) Provisional application No. 60/091,298, filed on Jun. 30, 1998.

(51) Int. Cl.[7] ............................................... H04L 12/56
(52) U.S. Cl. ...................................... 370/422; 370/466
(58) Field of Search ............................... 370/230, 360, 370/386, 422, 423, 428, 463, 465, 466, 470, 471, 473, 474

(56) References Cited

U.S. PATENT DOCUMENTS

| | | | |
|---|---|---|---|
| 4,685,101 A | * | 8/1987 | Segal et al. .................. 370/468 |
| 5,337,306 A | | 8/1994 | Hall et al. |
| 5,434,850 A | | 7/1995 | Fielding et al. |
| 5,499,241 A | | 3/1996 | Thompson et al. |
| 5,691,976 A | | 11/1997 | Engdahl et al. |
| 5,734,654 A | | 3/1998 | Shirai et al. |
| 5,825,829 A | * | 10/1998 | Borazjani et al. ........... 375/308 |
| 5,956,334 A | | 9/1999 | Chu et al. |
| 5,991,532 A | * | 11/1999 | Harada ........................ 703/27 |

FOREIGN PATENT DOCUMENTS

GB          2 280 337 A          1/1995

OTHER PUBLICATIONS

Ferguson S P: Implications of SONET and SDH, Electronics and Communication Engineering Journal, Jun. 1994, vol. 6, No. 3.

Kiyohiro Noguchi, Yumiko Kawashima, and Shinya Narita, A Highly Reliable Frame–Relay Switching Node Architecture Based on ATM Switching Technology, IEICE Trans. Commun., pp. 315–323, Feb. 1998.

* cited by examiner

*Primary Examiner*—Kwang Bin Yao
(74) *Attorney, Agent, or Firm*—Baker Botts, LLP; V. Lawrence Sewell; Jessica W. Smith

(57) ABSTRACT

A telecommunications network (12) includes a digital cross-connect system (10) that receives frame relay information carried in individual DS-0 signals over T-1 links (14) and/or multiple DS-0 signals over FT-1 links (16). The digital cross-connect system (10) includes a cross-connect matrix (44) that consolidates DS-0 signals into DS-1 signals. The digital cross-connect system (10) further includes a plurality of frame groomers (40) that extract frames from each DS-0 signal for consolidation into a frame groomed consolidated circuit. The frame groomed consolidated circuit from each frame groomer (40) is transferred in DS-3 signals to a concentrator (80). The concentrator (80) concentrates the received DS-3 signals into a single DS-3 signal for transport to an edge switch (24).

10 Claims, 4 Drawing Sheets

• CONSOLIDATE FRAMES FROM MULTIPLE TDM CIRCUITS IN TO ONE TDM CIRCUIT

US 6,590,899 B1

SYSTEM FOR CONSOLIDATING TELECOMMUNICATIONS TRAFFIC ONTO A MINIMUM NUMBER OF OUTPUT PATHS

CROSS REFERENCE TO RELATED APPLICATIONS

This application claims the benefit of U.S. Provisional Application No. 60/091,298 filed on Jun. 30, 1998. This application is a continuation-in-part of Ser. No. 08/777,775 filed Dec. 31, 1996, now U.S. Pat. No. 5,974,050 issued on Oct. 26, 1999.

TECHNICAL FIELD OF THE INVENTION

The present invention relates in general to telecommunications networks and more particularly to a system for consolidating telecommunications traffic onto a minimum number of output paths.

BACKGROUND OF THE INVENTION

Frame relay service providers, as well as asynchronous transfer mode service providers, require a sufficient number of ports in order to provide frame relay, and asynchronous transfer mode, services. However, these ports are extremely expensive to obtain compared to ports for a conventional cross-connect systems. Further, time division multiplexed links that provide access to frame relay services are extremely under-utilized due to the bursty nature of the information being transferred. The frame relay traffic is carried on fully allocated digital circuits such as DS-0, nxDS-0, T1, E1, T3, E3, et al. As a result, the variable bit rate characteristic of the frame relay traffic is not effectively exploited. Therefore, it is desirable to improve the efficiency of frame relay traffic transfer that would reduce the number of frame relay or asynchronous transfer mode ports required by the service provider.

SUMMARY OF THE INVENTION

From the foregoing, it may be appreciated that a need has arisen for an effective technique for transferring frame relay and asynchronous transfer mode traffic in order to reduce the number of ports required in handling this traffic. In accordance with the present invention, a system for consolidating telecommunications traffic onto a minimum number of output paths is provided that substantially reduce or eliminate disadvantages and problems associated with conventional frame relay and asynchronous transfer mode traffic transfer and processing.

According to an embodiment of the present invention, there is provided a telecommunications system that includes a digital cross-connect matrix operable to transport telecommunications traffic from any of a plurality of input ports to any of a plurality of output ports. A plurality of frame groomers are each operable to receive telecommunications traffic from predetermined output ports of the digital cross-connect matrix. Each frame groomer is operable to consolidate received telecommunications traffic onto a minimum number of output links. A concentrator is operable to receive telecommunications traffic from each output link of each frame groomer. The concentrator is operable to place the received telecommunications traffic onto a minimum number of output paths.

The present invention provides various technical advantages over conventional frame relay and asynchronous transfer mode traffic transfer and processing techniques. For example, one technical advantage is to consolidate frame relay or asynchronous transfer mode traffic onto preferably a single output link. Another technical advantage is to reduce the number of ports required to receive and transfer frame relay or asynchronous transfer mode traffic. Yet another technical advantage is to select frames from a plurality of input links for placement onto a consolidated output link. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
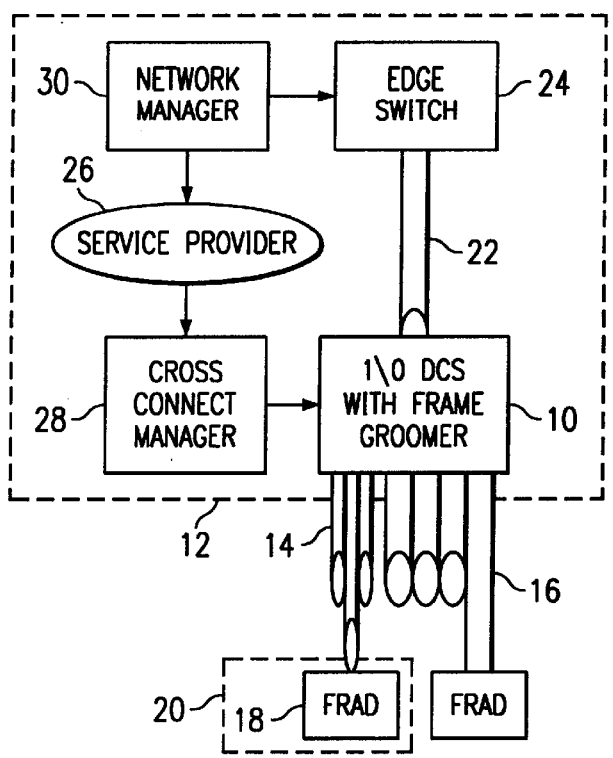
FIG. 1 illustrates a block diagram of a digital cross-connect system within a telecommunications network.

FIG. 1 is a block diagram of a digital cross-connect system 10 within a telecommunications network 12. Telecommunications network 12 preferably provides a frame relay permanent virtual connection exchange service. In a frame relay permanent virtual connection service, variable length frames are relayed from the source to the desired destination by means of permanent virtual connections. Each frame is addressed by a unique data link connection identifier which is associated with a particular permanent virtual connection connecting two end systems. Permanent virtual connections that define the logical paths between endpoints in a customer's network are established at service subscription time through administrative procedures.

In the downstream direction, digital cross-connect system 10 receives individual DS-0 signals carried over T-1 links 14 and/or multiple DS-0 signals carried over FT-1 links 16 from frame relay assembly/disassembly devices 18 of frame relay customers 20. Digital cross-connect system 10 extracts the frames making up the frame relay traffic from the DS-0 signals and consolidates the frames by multiplexing them into DS-1 signals onto an output link 22 for transfer to an edge switch 24. In the upstream direction, digital cross-connect system 10 demultiplexes frames received within DS-1 signals transferred by edge switch 24 over output link 22. The frames are then placed into DS-0 signals for transfer to frame relay assembly/disassembly devices 18 of frame relay customers 20 over T-1 links 14 and/or FT-1 links 16. Administration procedures for defining consolidation and permanent virtual connections is determined by a service provider 26 through provisioning criteria programmed into a cross-connect manager 28 in response to digital link connection identifiers determined by a frame relay network manager 30.

Figure 2:
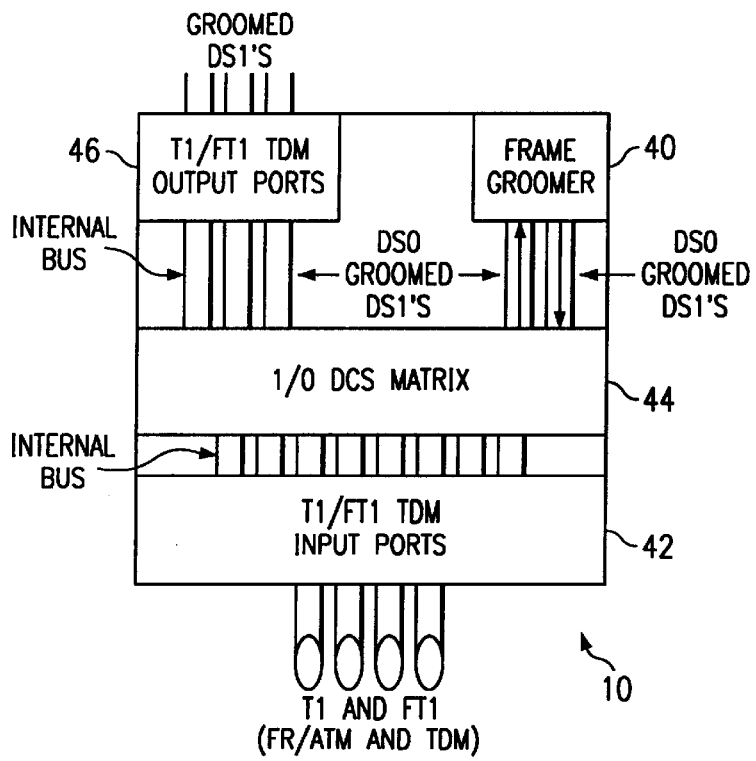
FIG. 2 illustrates a block diagram of a frame groomer within the digital cross-connect system.

FIG. 2 shows an operation of a frame groomer 40 within digital cross-connect system 10. Digital cross-connect system 10 receives frame relay information carried in individual or multiple DS-0 signals over T-1 links 14 and/or FT-1 links 16 at TDM input ports 42. The DS-0 signals pass through TDM input ports 42 over an internal bus to a cross-connect matrix 44. Cross-connect matrix 44 consolidates the DS-0 signals into internal data bus format. DS-0 signals identified as carrying frame relay information are carried over the internal data bus to frame groomer 40. Frame groomer 40 uses frame relay virtual circuit parameters and frame parameters to extract frames from each DS-0 signal within the internal data bus. The extracted frames are consolidated onto a frame relay groomed consolidated circuit carried in the internal data that are returned to cross-connect matrix 44 over the internal bus. Cross-connect matrix 44 sends the internal data signals carrying the frame groomed consolidated circuit over the internal bus to TDM output ports 46. TDM output ports 46 transfer the DS-1 signals over T-1 links to edge switch 24.

Figure 3:
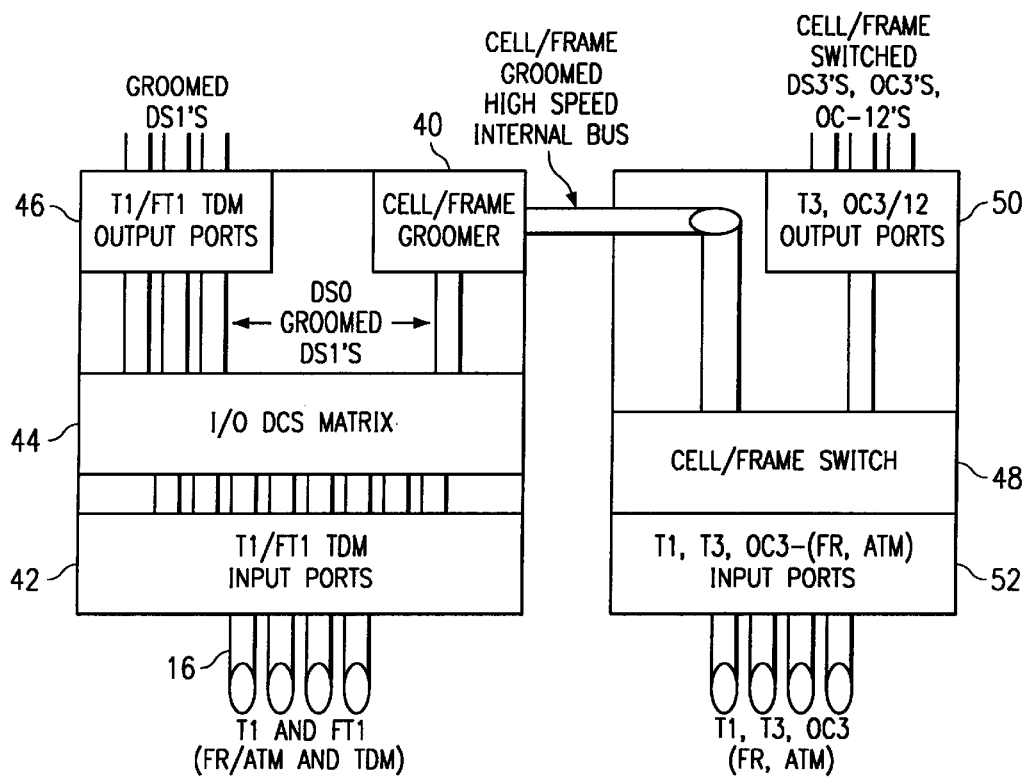
FIG. 3 illustrates an extension for the frame groomer to accommodate higher bandwidths.

FIG. 3 shows an extension of frame groomer 40 to higher bandwidth capability. Once frame groomer 40 generates the frame relay consolidated circuit, DS-0 signals carrying the frame relay consolidated circuit are transferred over a high speed internal bus to a frame switch 48. Frame switch 48 places the DS-1 signals into DS-3 signals for transfer to the network through high bandwidth output ports 50. Frame switch 48 can also process frame relay information received at high bandwidth input ports 52 for transfer to the network through high bandwidth output ports 50 or through frame groomer 40 and digital cross-connect system 10.

Figure 4:
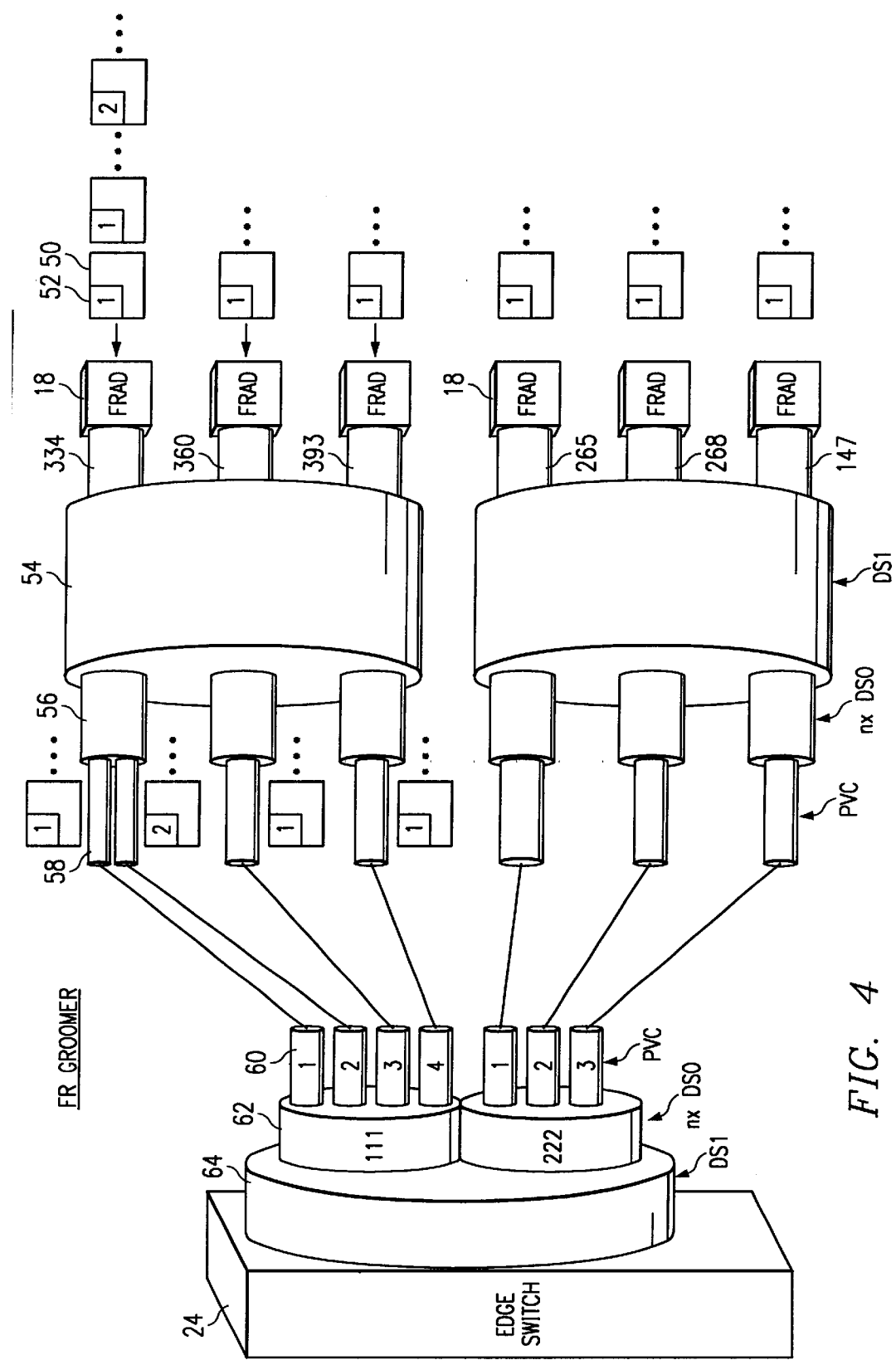
FIG. 4 illustrates the mapping performed by the frame groomer.

FIG. 4 shows the mapping performed by frame groomer 40 in consolidating frames of the frame relay information. During TDM provisioning on digital cross-connect system 10, frame groomer 40 through cross-connect manager 28 is provided information to identify physical circuits, such as T-1 links 14 and DS-0 signals, that carry frame relay traffic in and out of digital cross-connect system 10. During frame relay permanent virtual connection provisioning, frame groomer 40 receives standard frame relay control messages from edge switch 24 or by alternate network management connections that include data link connection identifier information associated with individual permanent virtual connections. Frame groomer 40 maps data link connection identifiers for edge switch 24 to data link connection identifiers for frame relay assembly/disassembly devices 18. Mapping and creation of data link connection identifiers is performed in frame groomer 40 through an internal mapping table. Table 1 shows an example of an internal mapping table for frame groomer 40.

TABLE 1

INTERNAL MAPPING TABLE

| INPUT TDM LINK | INPUT DLCI | OUTPUT TDM LINK | OUTPUT DLCI |
|---|---|---|---|
| 334 | 1 | 111 | 1 |
| 334 | 2 | 111 | 2 |
| 380 | 1 | 111 | 3 |
| 393 | 1 | 111 | 4 |
|  |  | 111 | MAX DLCI # |
| 265 | 1 | 222 | 1 |
| 268 | 1 | 222 | 2 |
| 149 | 1 | 222 | 3 |
| " | " | " | " |
| " | " | " | " |
| " | " | 222 | MAX DLCI # |

Using Table 1 as an example, frames 50 carried in DS-0 signals and each having their own DLCI 52 are received at digital cross-connect system 10 over input links 334, 380, and 393. The DS-0 signals from input links 334, 380, and 393 are consolidated into a DS-1 physical circuit 54 by cross-connect matrix 44. Logical circuits 56, each associated with one of the input links, within physical circuit 54 identified as carrying frame relay information are sent to frame groomer 40 over the internal bus of digital cross-connect system 10. Frame groomer 40 consolidates individual permanent virtual connections 58, each associated with a specific DLCI 52, from each logical circuit 56 and maps these individual permanent virtual connections 58 into permanent virtual connections 60 consolidated into a DS-0 logical circuit 62 associated with edge switch 24. DS-0 logical circuits 62 are placed into a DS-1 physical circuit 64 by frame groomer 40 and cross-connect matrix 44 for transfer to edge switch 24.

During a congestion situation, frame groomer 40 will initiate congestion management procedures. Congestion occurs when the input frame traffic associated with one or a group of permanent virtual connections associated with an output link exceeds the capacity of the output link. Upon this occurrence, frame groomer 40 will discard frames according to a priority order pre-determined by network administration. Frame groomer 40 initially discards frames tagged as discard eligible. Each frame carries a flag that determines whether the particular frame has been pre-determined as being eligible for discard. Next, frame groomer 40 discards frames associated with permanent virtual connections that have a committed information bit rate value of zero with no peak rate. Next, frame groomer 40 discards frames associated with permanent virtual connections that are exceeding their pre-defined peak rate. Next, frame groomer 40 discards frames associated with permanent virtual connections that are exceeding their pre-defined committed information rate value. Upon discarding a frame, frame groomer 40 sends a far end congestion notification message per frame relay standards. For congestion situations occurring in the network beyond edge switch 24 and/or in frame relay assembler/disassembler devices 18, frame groomer 40 transparently passes far end and back end congestion notification messages without taking any further action on these messages.

Figure 5:
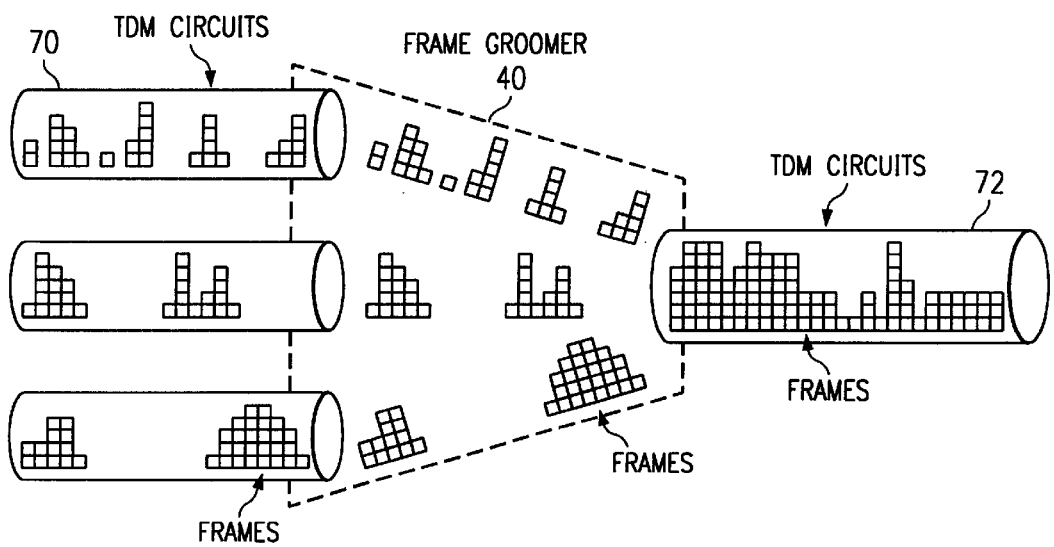
FIG. 5 illustrates how consolidation is performed by the frame groomer.

FIG. 5 shows an example of how consolidation is performed by digital cross-connect system 10. Digital cross-connect system 10 receives frame relay traffic from a plurality of time division multiplexed (TDM) circuit input links 70. Each TDM circuit input link 70 such as DS-0 signals carried over T-1 links 14 and FT-1 links 16, carries the frame relay traffic without being fully utilized. The bursty nature of the frame relay traffic controls the transfer rate and occupancy of the TDM circuit links. Digital cross-connect system 10, through frame groomer 40, accumulates the frame relay traffic from multiple TDM circuit input links for placement onto as few as one TDM circuit output link 72. TDM circuit output link 72 improves the efficiency of the under-utilized TDM circuit output links 70 by consolidating their frame relay traffic for improved circuit link utilization.

Figure 6:
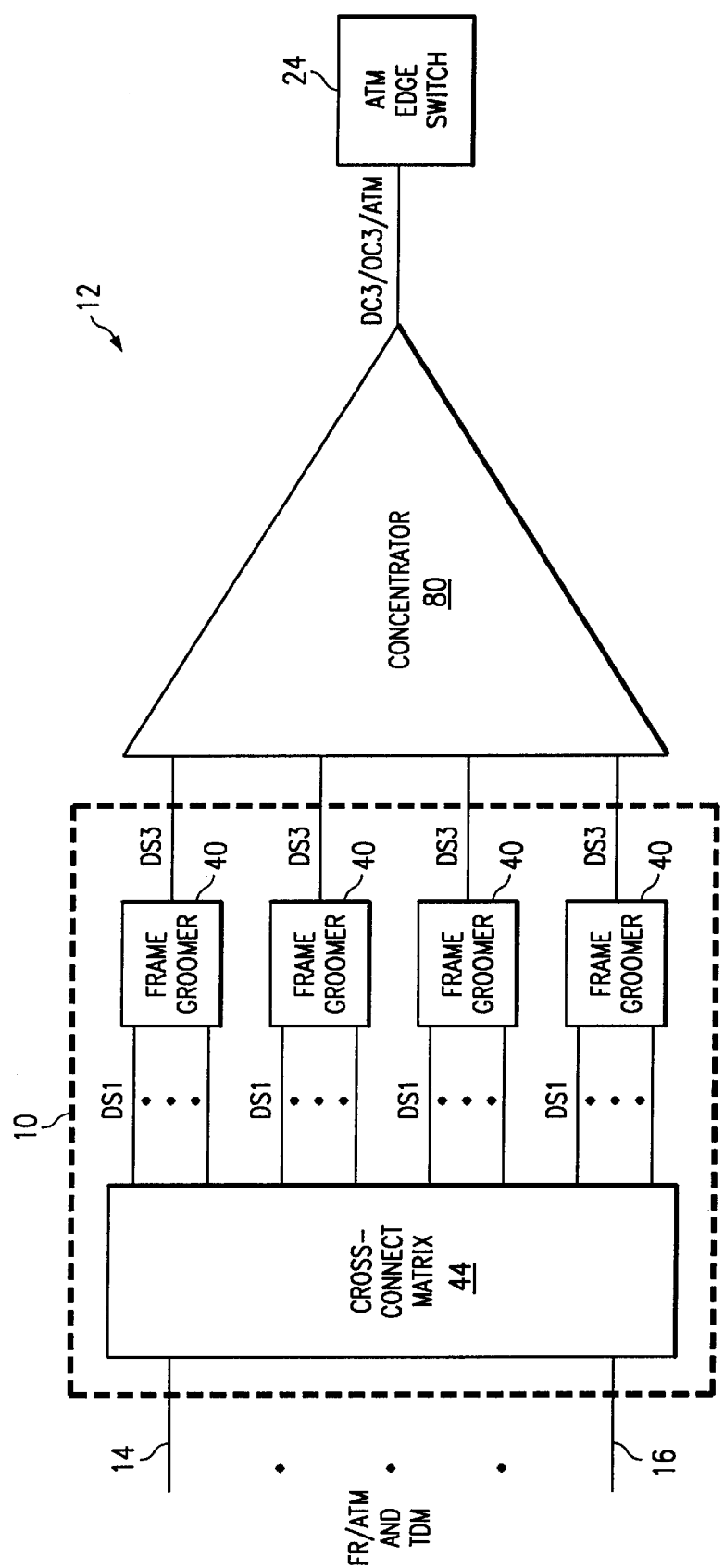
FIG. 6 illustrates a telecommunications system employing multiple frame groomers.

FIG. 6 is a block diagram of telecommunications system 12 having a digital cross-connect system 10 with multiple frame groomers 40. Though each individual frame groomer 40 provides consolidation of frame relay traffic, greater consolidation may be desired in larger implementations. For example, each frame groomer 40 may receive a multitude of DS-1 signals from cross-connect matrix 44. Each frame groomer 40 performs consolidation as described above and generates a DS-3 signal as an output. However, the bursty nature of the traffic may still result in the larger DS-3 signals having less than full capacity.

To remedy this situation, a concentrator 80 may be used to consolidate the DS-3 outputs of frame groomers 40 onto a single DS-3 signal in order to minimize a number of ports needed at edge switch 24. Concentrator 80 may provide consolidation of the received DS-3 signals through any of various techniques including multiplexing schemes and prioritization implementations. Concentrator 80 may be implemented within digital cross connect system 10 or as a separate stand alone unit.

Edge switch 24 may be an Asynchronous Transfer Mode (ATM) switch that receives ATM cells over the DS-3 connection from concentrator 80. Each frame groomer 40 may include the ability to convert the frame relay information into the asynchronous transfer mode cell format, or receive telecommunications traffic in the asynchronous transfer mode cell format from cross-connect matrix 44, for transfer to ATM edge switch 24. Though four frame groomers 40 are shown, telecommunications system 10 may employ any number of frame groomers 40 to satisfy desired design requirements.

Thus, it is apparent that there has been provided, in accordance with the present invention, a system, device, and method for consolidating frame information on a minimum number of output links that satisfy the advantages set forth above. Although the present invention has been described in detail, it should be understood that various changes, substitutions, and alterations can be made herein. For example, though discussed in terms of frame relay information, the present invention can equally be incorporated into an asynchronous transfer mode system in order to consolidate asynchronous transfer mode cells received from multiple links for transfer onto as few as a single link. Further, though the present invention has discussed signals in terms of DS-0, DS-1, and DS-3, these signals exemplify one type of embodiment whereas other signal protocols may also be readily implemented by those skilled in the art without any difficulty. Other examples are readily ascertainable by one skilled in the art and can be made without departing from the spirit and scope of the present invention as defined by the following claims.

What is claimed is:

1. A telecommunications system, comprising:

a digital cross-connect matrix operable to transport telecommunications traffic from any of a plurality of input ports to any of a plurality of output ports;

a plurality of frame groomers each operable to receive telecommunications traffic from predetermined output ports of the digital cross-connect matrix, each frame groomer operable to identify frame relay traffic received from the digital cross-connect matrix and consolidate the frame relay traffic received into a fewer number of output links;

a concentrator operable to receive telecommunications traffic from each output link of each frame groomer at a first data rate, the concentrator operable to further consolidate the received telecommunications traffic onto a fewer number of output paths at the first data rate.

2. The telecommunications system of claim 1, further comprising:

an edge switch operable to receive telecommunications traffic from the output paths of the concentrator.

3. The telecommunications system of claim 1, wherein the frame relay traffic is carried in a digital signal level three telecommunications signal.

4. The telecommunications system of claim 1, wherein each frame groomer converts the frame relay traffic into asynchronous transfer mode cell format and provides telecommunications traffic in asynchronous transfer mode cell format to the concentrator.

5. The telecommunications system of claim 4, wherein the asynchronous transfer mode cell format is carried in a digital signal level three telecommunication signal.

6. The telecommunications system of claim 1, wherein the plurality of frame groomers consolidate the frame relay traffic by consolidating individual permanent virtual connections associated with a specific data link connection identifier.

7. A telecommunications system, comprising:

a digital cross-connect matrix operable to transport telecommunications traffic from a plurality of input ports to a plurality of output ports;

one or more frame groomers each operable to receive telecommunications signals at a first data rate from predetermined output ports of the digital cross-connect matrix, each frame groomer operable to identify frame relay traffic from the received telecommunications signals and consolidate the frame relay traffic into a fewer number of telecommunication signals at the same first data rate; and a concentrator operable to receive telecommunications signals from each output link of each frame groomer, the concentrator operable to further consolidate the received telecommunications signals into a fewer number of output signals.

8. The telecommunications system of claim 7, wherein the one or more frame groomers converts the frame relay traffic into asynchronous transfer mode (ATM) cell format for output to the concentrator.

9. The telecommunications system of claim 8, wherein the output signals of the concentrator are transmitted to an ATM edge switch.

10. The telecommunications system of claim 7, wherein the concentrator receives telecommunications signals from each output link of each frame groomer at a second data rate and is operable to further consolidate the received telecommunications traffic into a fewer number of output signals at the same second data rate.

* * * * *